(12) United States Patent
Lewis et al.

(10) Patent No.: US 6,591,236 B2
(45) Date of Patent: *Jul. 8, 2003

(54) METHOD AND SYSTEM FOR DETERMINING AVAILABLE AND ALTERNATIVE SPEECH COMMANDS

(75) Inventors: James R. Lewis, Delray Beach, FL (US); Kerry Ortega, Deerfield Beach, FL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,814

(22) Filed: Apr. 13, 1999

(65) Prior Publication Data

US 2002/0161584 A1 Oct. 31, 2002

(51) Int. Cl.$^7$ ............................................. G10L 15/04
(52) U.S. Cl. ..................... 704/251; 704/243; 704/257; 704/255
(58) Field of Search .................. 704/275, 244, 704/251, 257, 260, 235, 243, 255, 270.1

(56) References Cited

U.S. PATENT DOCUMENTS

| | | | | | |
|---|---|---|---|---|---|
| 4,864,623 | A | * | 9/1989 | Van Nes et al. | 704/275 |
| 5,255,386 | A | * | 10/1993 | Prager | 395/600 |
| 5,748,841 | A | * | 5/1998 | Morin et al. | 704/257 |
| 5,915,001 | A | * | 6/1999 | Uppaluru | 379/88.22 |
| 5,937,385 | A | * | 8/1999 | Zadrozny et al. | 704/257 |
| 6,073,102 | A | * | 6/2000 | Block | 704/275 |
| 6,119,085 | A | * | 9/2000 | Lewis et al. | 704/260 |
| 6,138,100 | A | * | 10/2000 | Dutton et al. | 704/275 |
| 6,182,046 | B1 | * | 1/2001 | Ortega et al. | 704/275 |
| 6,192,343 | B1 | * | 2/2001 | Morgan et al. | 704/275 |
| 6,208,971 | B1 | * | 3/2001 | Bellegarda et al. | 704/275 |

* cited by examiner

Primary Examiner—Vijay Chawan
(74) Attorney, Agent, or Firm—Akerman Senterfitt

(57) ABSTRACT

A method and system for use with a computer speech recognition system to efficiently identify valid system commands to users. The method involves a series of steps including: receiving data representative of a speech recognition system user input; comparing the data to a grammar defined for the speech recognition system to determine whether the data is representative of a user input which is a valid system command; and notifying the user as to whether the data is representative of a valid system command. The process can also involve the additional steps of determining a functional expression for the data; and comparing the functional expression to a set of all functional expressions permitted in the grammar to identify any alternate user inputs for producing the functional expression.

16 Claims, 8 Drawing Sheets

```
<move> = <moveAct> TO THE <where> OF <what>
       | <moveAct> TO <what's> <where>                -> move ({6},{4})
                                                       -> move ({3},{4})
<moveAct> = MOVE | GO | JUMP .

<where> = TOP                                          ->top
        | BEGINNING                                    ->top
        | START                                        ->top
        | END                                          ->bottom
        | BOTTOM                                       ->bottom <what> = THE FIRST SECTION                             ->firstsection
       | THE FIRST PAGE                                ->firstpage
       | THE LAST SECTION                              ->lastsection
       | THE LAST PAGE                                 ->lastpage <what's> = THE FIRST SECTION'S                         ->firstsection
         | THE FIRST PAGE'S                            ->firstpage
         | THE LAST SECTION'S                          ->lastsection
         | THE LAST PAGE'S                             ->lastpage
```

FIG. 7

METHOD AND SYSTEM FOR DETERMINING AVAILABLE AND ALTERNATIVE SPEECH COMMANDS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Technical Field

This invention relates to the field of computer speech recognition and more particularly to a method and system for informing a system user of available and alternative speech commands.

2. Description of the Related Art

Speech recognition is the process by which an acoustic signal received by microphone is converted to a set of text words by a computer. These recognized words may then be used in a variety of computer software applications for purposes such as document preparation, data entry and command and control. Speech recognition is generally a difficult problem due to the wide variety pronunciations, individual accents and speech characteristics of individual speakers.

One of the difficult aspects of speech recognition systems relates to a user's ability to navigate through the speech-enabled application using various commands and controls. In the simplest possible command and control grammar, each function that the system can perform has no more than one speech phrase associated with it. At the other extreme is a command and control system based on natural language understanding (NLU). In an NLU system, the user can express commands using natural language, thereby providing total linguistic flexibility in command expression. Current command and control systems are moving beyond the simple one function—one speech phrase grammar, but will not achieve NLU in the foreseeable future.

For systems that approach but do not achieve the flexibility of NLU, it is possible that a user may wish to gain a better understanding of the speech commands which are available. For example, it is possible that a given user may want to know whether a particular speech command will be recognized. Alternatively, a user who knows one way of issuing a speech command might want to know the other ways that he or she could issue speech commands to achieve the same system function or operation. This desire might come from simple curiosity, or might arise from a desire to determine a more efficient speech command or a desire to try out speech commands that have a better recognition accuracy for that user than the speech command that he or she has been using.

Conventional speech recognition systems offer various means to present the user with a list of all valid speech commands, typically filtered in some way to facilitate a search for a particular command. This approach works reasonably well given fairly simple command and control grammars. However, as command and control grammars begin to approach NLU, the number of available ways to state commands increases to the point of making such approaches cumbersome. Thus, there has arisen a need to provide more effective systems and methods for informing a system user of available and alternative speech commands.

SUMMARY OF THE INVENTION

The invention concerns a method and system for efficiently identifying valid system command in a speech recognition system. The method of the invention involves a plurality of steps including: receiving data representative of a speech recognition system user input; comparing the data to a grammar defined for the speech recognition system to determine whether the data is representative of a user input which is a valid system command; and notifying the user as to whether the data is representative of a valid system command. Further, the method can include the additional steps of: determining a functional expression for the data; and comparing the functional expression to a set of all functional expressions permitted in the grammar to identify any alternate user inputs for producing the functional expression.

According to one aspect of the invention, the process can include notifying the user of the alternate user inputs for producing the functional expression and listing the alternate user inputs in sequence based upon a criteria. For example, the criteria can be the order in which the alternate user inputs were identified in the search, alphabetical order, length, recognition accuracy, and a user preference. In the case where there are not other alternative user inputs, the method can include the step of notifying the user that there exist no alternate user inputs for producing the functional expression. Although the method can employ any suitable programming for searching out alternative user inputs to achieve the same functional result, one advantageous method for accomplishing this result is by searching a set of translation rules to identify the functional expression and the alternate user inputs.

According to a second aspect, the invention can be a computer speech recognition system for efficiently identifying valid system commands to users. In that case, the system includes interface programming for receiving data representative of a speech recognition system user input; processor programming for comparing the data to a grammar defined for the speech recognition system to determine whether the data is representative of a user input which is a valid system command; and display programming for notifying the user as to whether the data is representative of a valid system command. The system also preferably includes function determining programming for determining a functional expression for the data; and function comparison programming for comparing the functional expression to a set of all functional expressions permitted in the grammar to identify any alternate user inputs for producing the functional expression. The function determining programming can preferably include programming for searching a set of translation rules to identify the functional expression and the alternate user inputs.

Similar to the previously described method, the system display programming further comprises programming for notifying the user of the alternate user inputs for producing the functional expression and programming for listing the alternate user inputs in sequence based upon criteria selected from the group consisting of: the order in which they were identified in the search, alphabetical order, length, recognition accuracy, and a user preference. Finally, the system display programming can further include programming for notifying the user that there exist no alternate user inputs for producing the functional expression.

According to a third aspect, the invention may comprise a machine readable storage, having stored thereon a computer program having a plurality of code sections executable by a machine for causing the machine to perform a series of steps. These steps can include: receiving data representative of a speech recognition system user input; comparing the data to a grammar defined for the speech recognition system to determine whether the data is representative of a user input which is a valid system command; and notifying the user as to whether the data is representative of a valid system command. The machine readable storage may cause the machine to perform additional steps such as determining a functional expression for the data; and comparing the functional expression to a set of all functional expressions permitted in the grammar to identify any alternate user inputs for producing the functional expression. The machine readable storage can also be programmed for causing the machine to perform the further step of notifying the user of the alternate user inputs for producing the functional expression. As previously described relative to the method and system of the invention, the machine readable storage can similarly be arranged for causing the machine to perform the further step of listing alternate user inputs in sequence based upon specified criteria.

BRIEF DESCRIPTION OF THE DRAWINGS

There are presently shown in the drawings embodiments which are presently preferred, it being understood, however, that the invention is not so limited to the precise arrangements and instrumentalities shown, wherein:

FIG. 7 is an example of a set of translation rules.

DETAILED DESCRIPTION OF THE INVENTION

Figure 1:
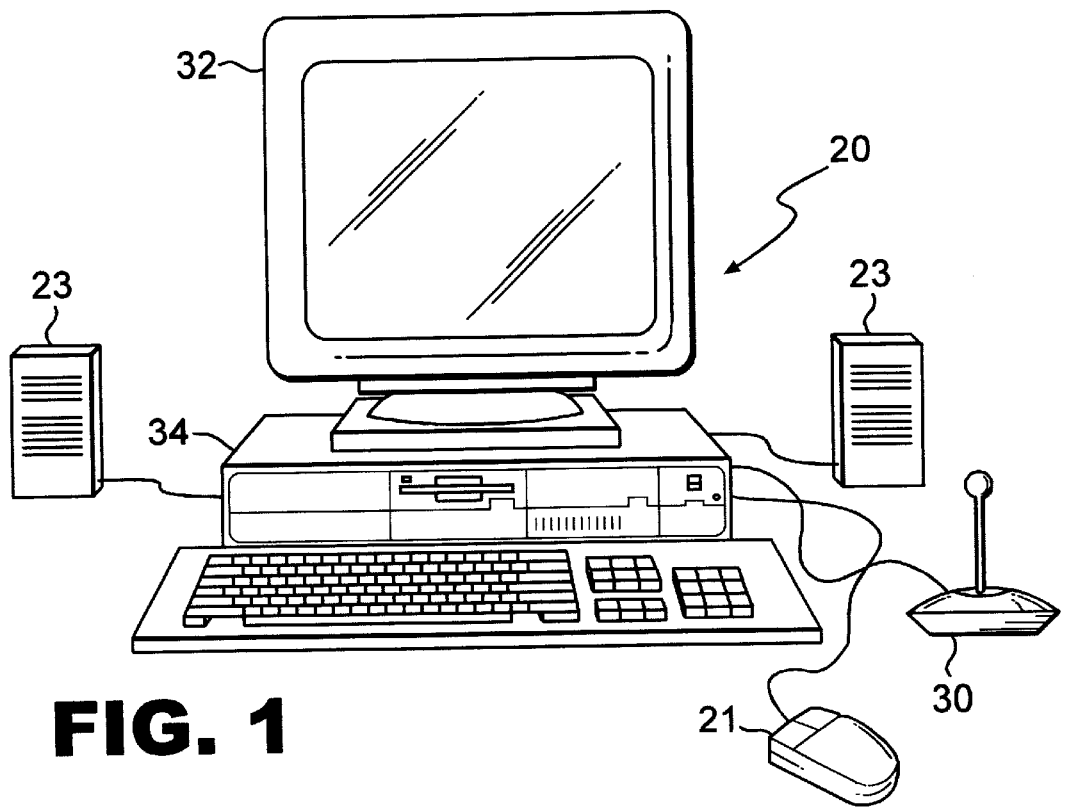
FIG. 1 shows a computer system for speech recognition on which the system of the invention can be used.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to the computer system through suitable interface circuitry or a "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, can also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
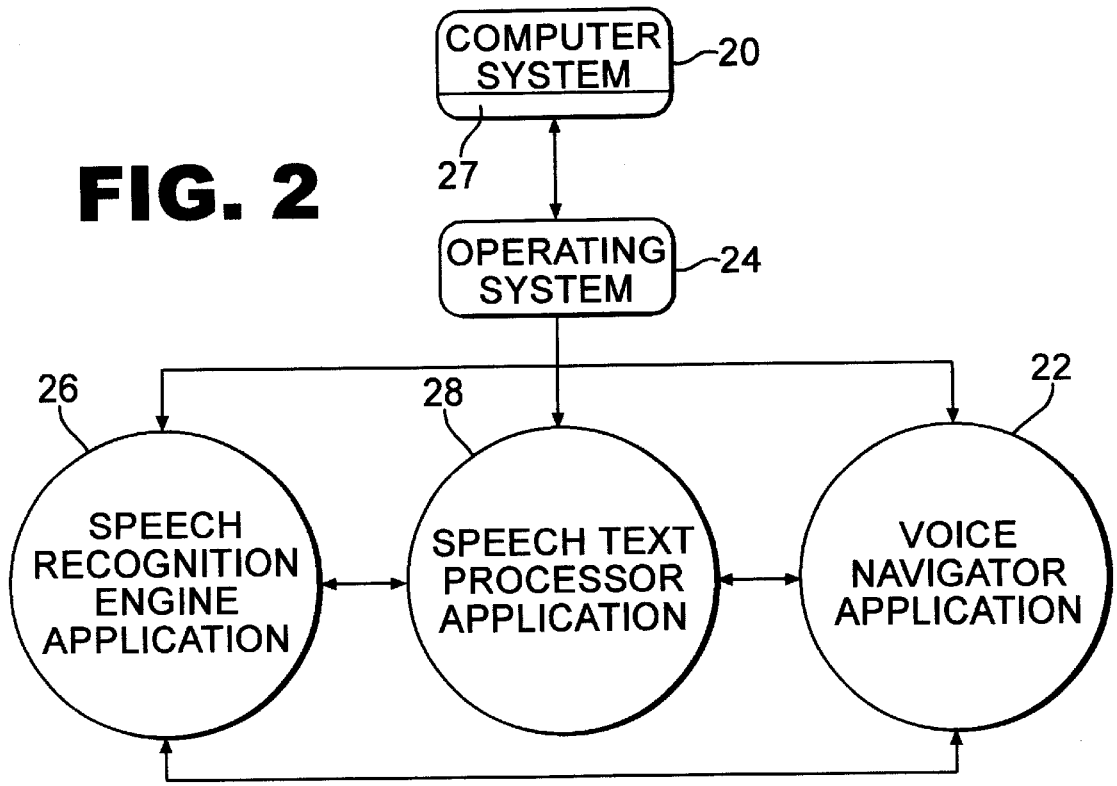
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. In the example shown, a speech text processor application 28 and a voice navigator application 22 are also provided. However the invention is not limited in this regard and the speech recognition engine application 26 can be used with any other application program which is to be voice enabled. In FIG. 2, the speech recognition engine 26, speech text processor 28 and the voice navigator 22 are shown as separate application programs. It should be noted however that the invention is not limited in this regard, and these various application programs could be implemented as a single, more complex applications program. For example the speech recognition application 26 could be combined with the speech text processor application or with any other application to be used in conjunction with the speech recognition application. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
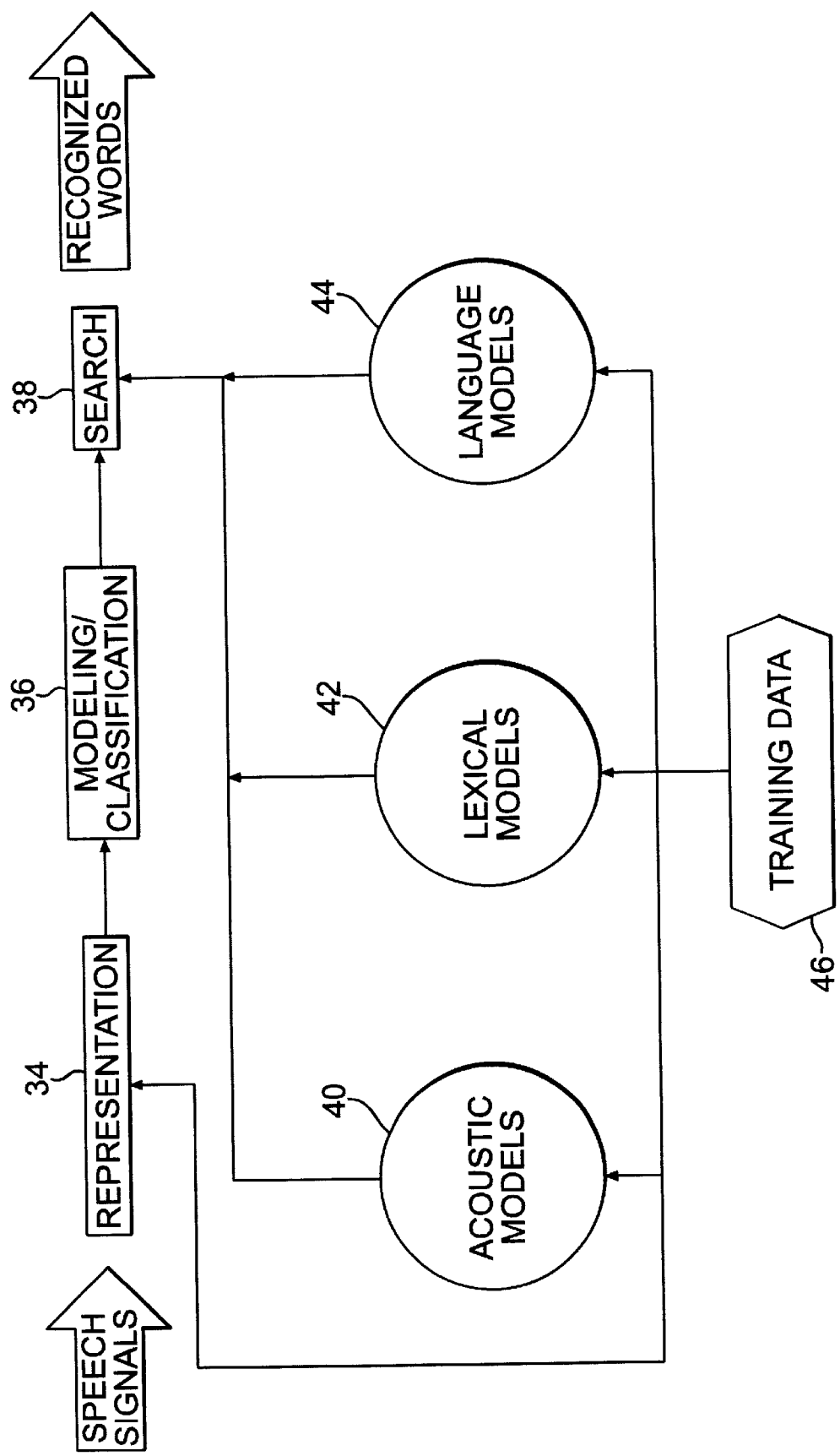
FIG. 3 is a block diagram showing a typical architecture for a speech recognition engine.

FIG. 3 is a block diagram showing typical components which comprise speech recognition application 26. As shown in FIG. 3 the speech recognition engine 26 receives a digitized speech signal from the operating system. The signal is subsequently transformed in representation block 34 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42 and language models 44.

Figure 4A:
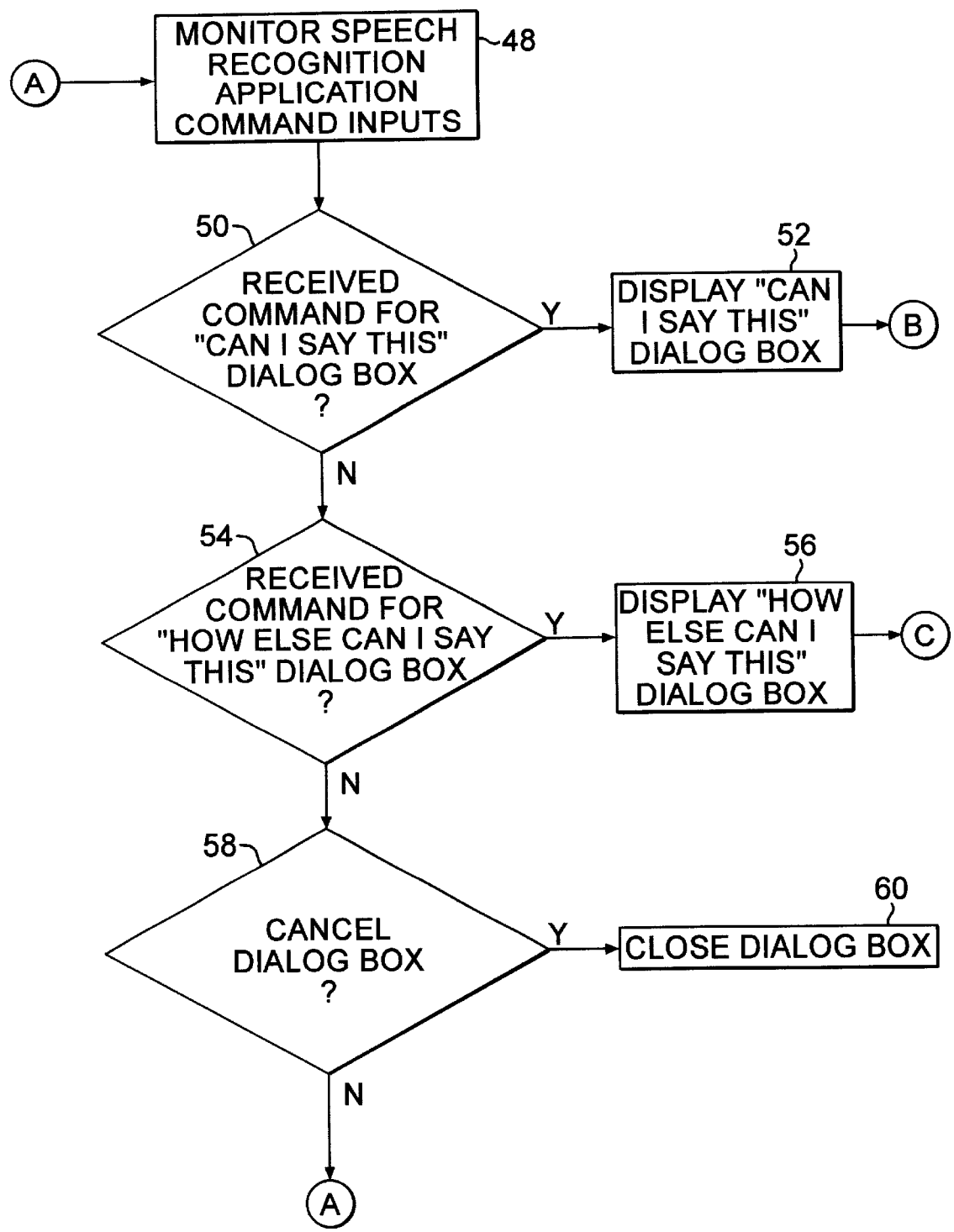
FIG. 4 is a flow chart illustrating a process for informing a speech recognition system user of available and alternative speech commands.
Figure 4B:
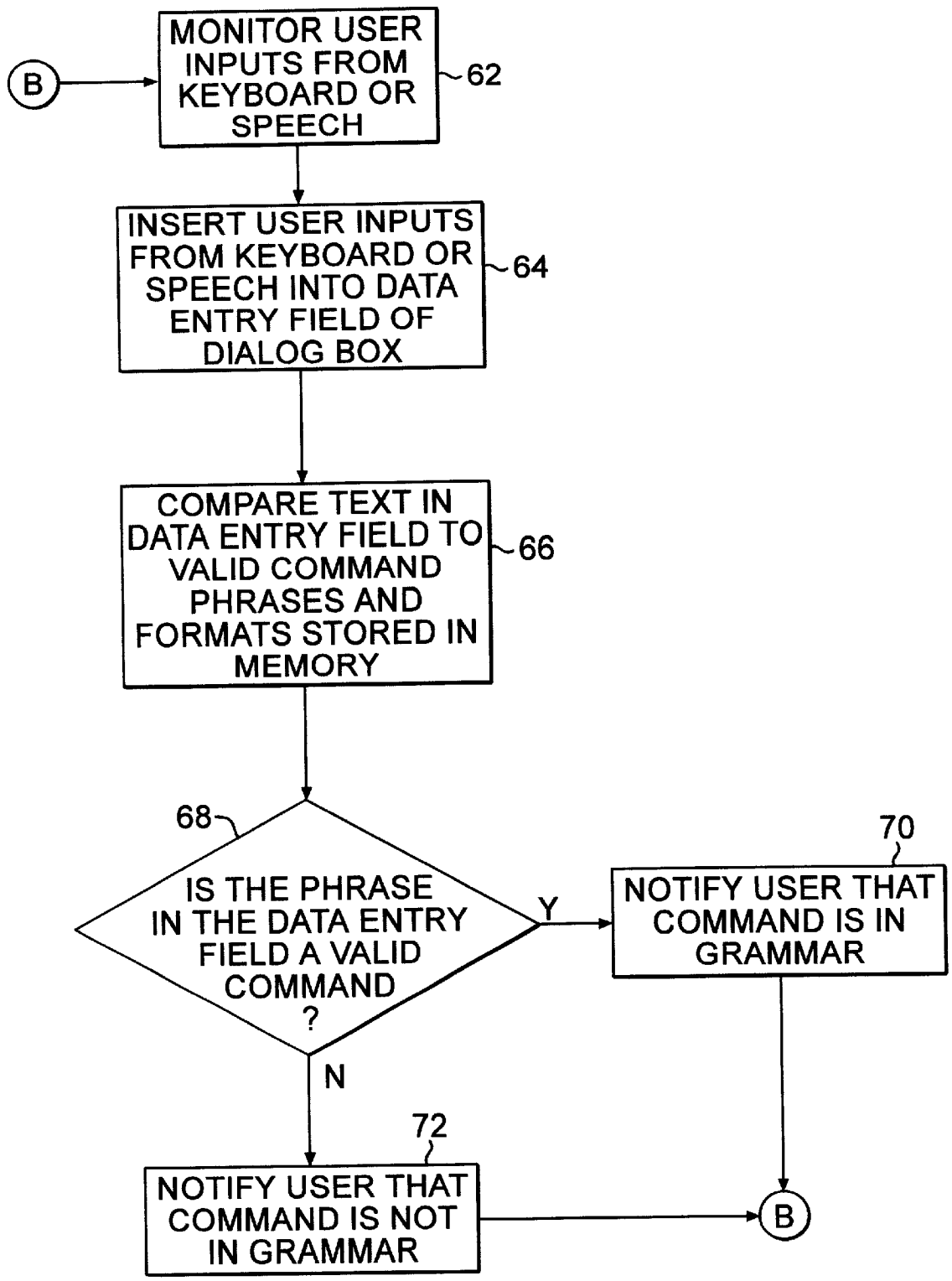
Figure 4C:
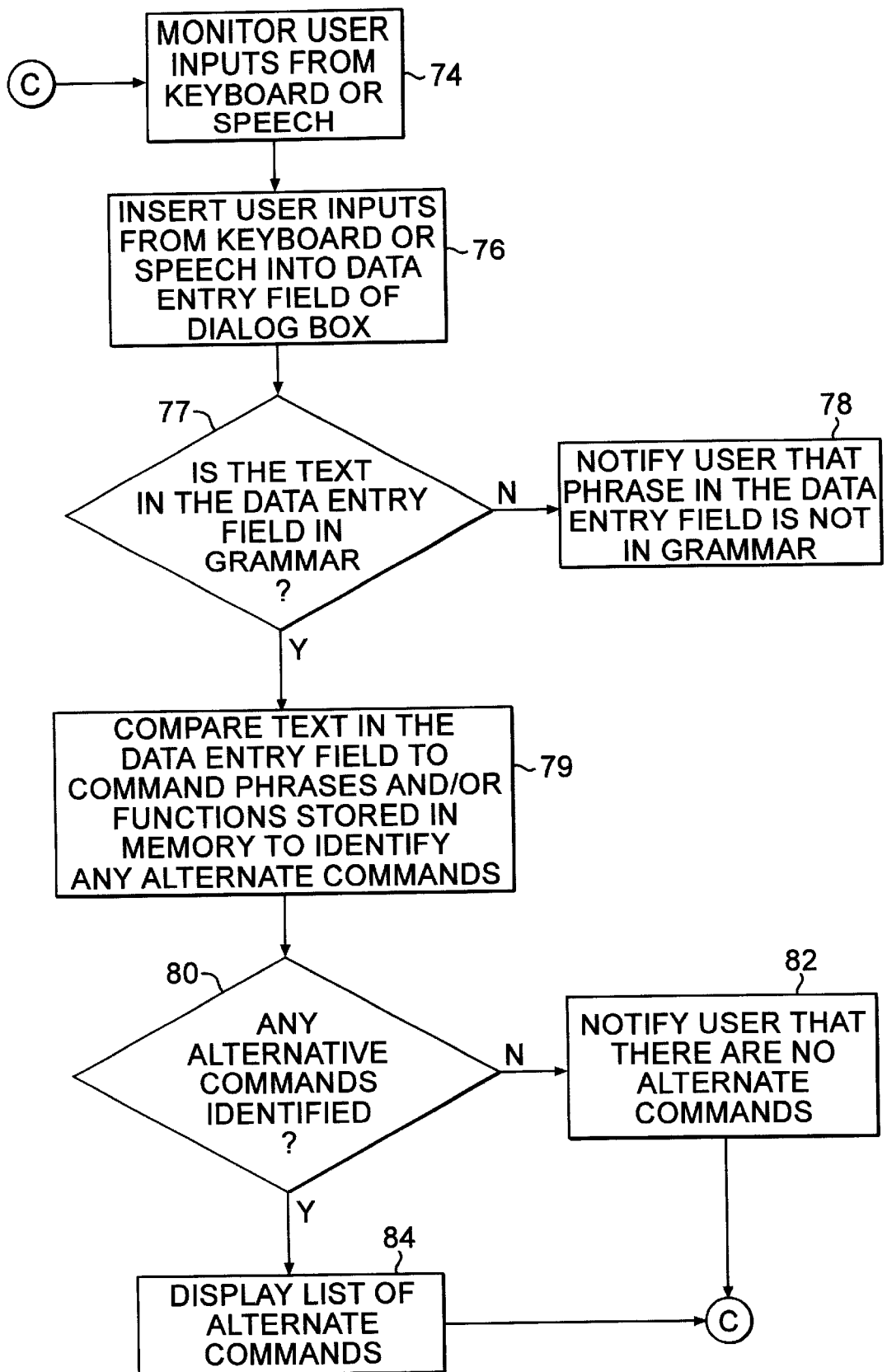

FIG. 4 is a flow chart illustrating a method for permitting a user to discover available and alternative speech commands. As shown in FIG. 4A, the speech recognition engine application 26 monitors user inputs in step 48. These user inputs can include navigator commands, commands or dictation inputs directed to an associated speech enabled application program, and command directed to the speech recognition application engine application 26. The user inputs are preferably speech commands, but can also be in the form of control signals received via the operating system 24 from a pointing device such as a mouse or a keyboard. In step 50, the system determines whether it has received a user input inquiring as to whether a particular command is valid. In step 50, the command for this purpose is shown as "Can I say this?" However, the invention is not limited in this regard and it will be understood by those skilled in the art that any other appropriate command utterance can be used for this purpose. Similarly, the "Can I say this?" command can also be made available to the user by an on-screen icon or menu command which has the same effect as the speech command.

Figure 5A:
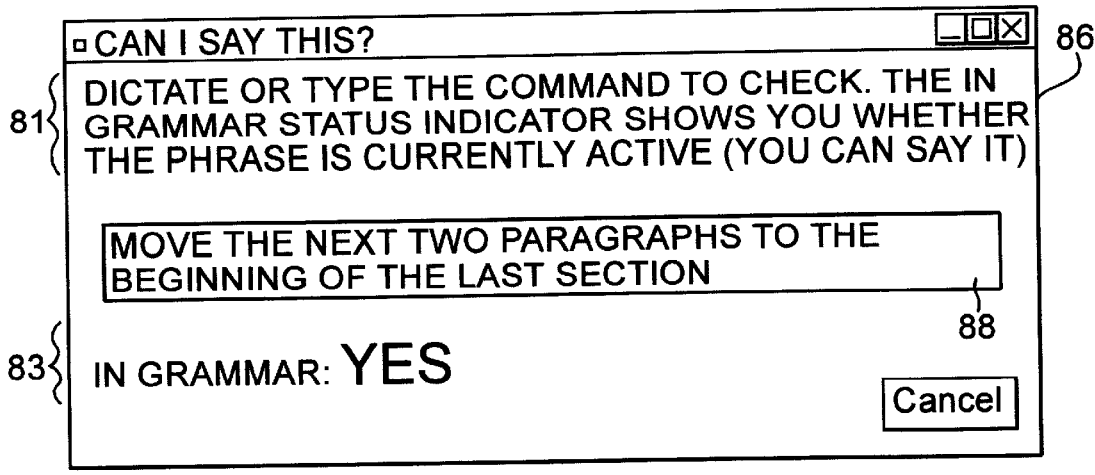
FIGS. 5A and B show a dialog box for informing a speech recognition system user whether a speech command is available.
Figure 5B:
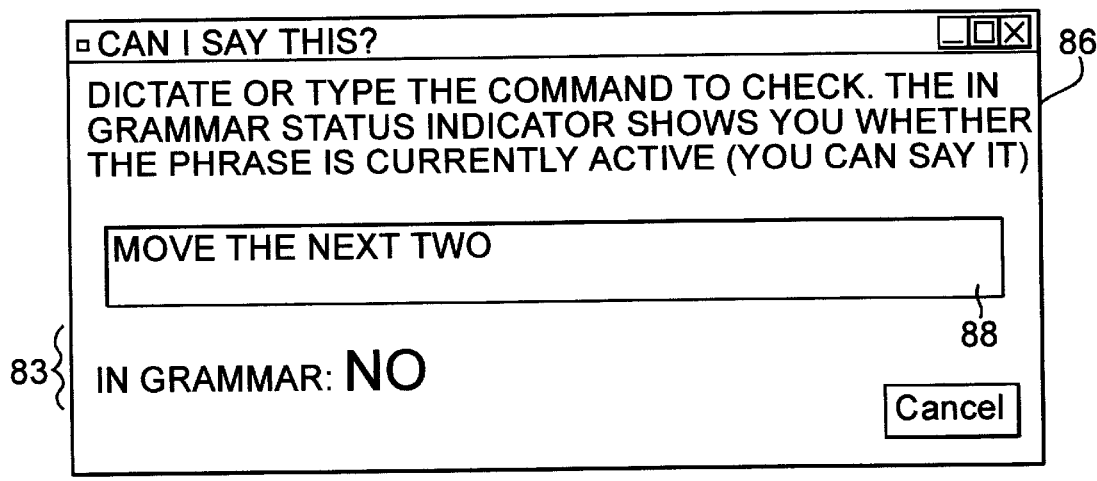

If the speech recognition system receives the proper command in step 50, it proceeds to step 52 to display the "Can I say this?" dialog box. An example of such a dialog box 86 is illustrated in FIGS. 5A and 5B. As shown therein, the dialog box 86 preferably consists of a set of instructions 81, a data entry field 88 in which phrases that are spoken or typed by a user can be entered when the dialog box 86 is open, and a status area 83 showing whether the given phrase is or is not in the active command grammar.

As shown in FIG. 4B, the system monitors user inputs in step 62. These inputs, which can be in the form of keyboard entries or words spoken by a user, are inserted in step 64 into the data entry field 88. These words or phrases are then compared in step 66 to valid command phrases and/or formats stored in memory. In step 68, a determination is made as to whether the phrase or text in the data entry field 88 is valid system command. If so, then the user is notified in step 70 that the command is in the current command grammar. As shown in FIG. 5A, the status area 83 is preferably used for this purpose by displaying the word "Yes". If the phrase or text is found not to be a valid system command, then the user is notified in step 72 that the command is not in the current command grammar, preferably by displaying the word "No" in the status area 83. In this way, a user can determine whether a phrase they plan to say, or have been saying with unsuccessful results, is in or out of the current command grammar.

The foregoing process is useful in a speech recognition system in which the number of active command phrases causes search through a conventional list of possible commands to be impractical and inconvenient. The system is also useful for helping a user to determine if the failure of the speech system to recognize a particular phrase is due to the phrase not being in the active grammar or must be due to some other cause.

Figure 6:
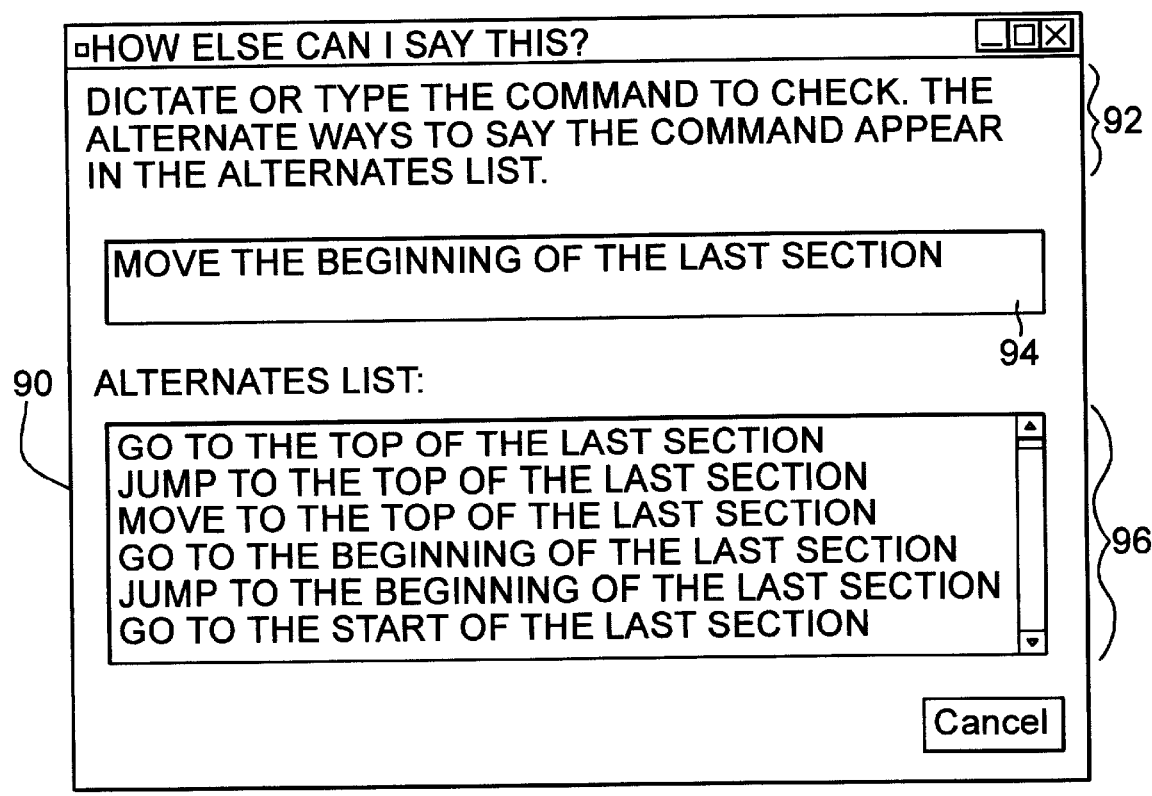
FIG. 6 shows a dialog box for informing a speech recognition system user of alternative command phrases which are available.

In addition to the need to help users determine whether a particular phrase is a valid command, recent developments have also demonstrated the need for a system which also helps users identify alternative commands given a known valid command. In particular, speech systems are developing such that they are approaching but do not quite have natural language understanding. This means that a wide variety of commands might be acceptable for achieving a particular result. However, certain commands may be more or less efficient than others. Also, a particular user's pronunciations for certain commands may be more readily understood by the speech recognition system than others. Accordingly, step 54 in FIG. 4A preferably monitors system inputs for a spoken command or its equivalent mouse or keyboard input to determine if the system has received a command associated with the "How else can I say this?" dialog box. If such a command is received, the system proceeds in step 56 to open the "How can I say this?" dialog box 90 which is shown in FIG. 6.

The "How else can I say this?" dialog box preferably includes a set of instructions 92, a data entry field 94 in which phrases that are spoken or typed by a user can be entered when the dialog box 90 is open, and an alternate command list area 96. Of course, the invention is not limited in this regard and any equivalent arrangement of information will also be acceptable.

After opening the "How else can I say this?" dialog box in step 56, the system proceeds in step 74 to monitor user inputs from the keyboard or speech. In step 76, any such user inputs are inserted into the data entry field 94. In a preferred embodiment, the cue to the system to begin the search for alternates would be a 300 to 500 millisecond pause in the dictation or typing of the input phrase. The resumption of typing or dictation would trigger another search after a similar pause. An alternate way to achieve this would be to have a search button included in the dialog box. However, searching on pause requires less effort from the user.

In step 77, the system makes an initial determination as to whether the input phrase exists in the active grammar. If not then it preferably notifies the user of this fact by displaying a suitable message in the alternate list area 96 such as "<Not in grammar>." If the phrase does exist in the active command grammar, then the system proceeds to step 79 as shown.

In step 79, the system compares the text in the data entry field 94 to the command phrases and/or functions stored in memory to identify any equivalent alternate commands. It will be appreciated by those skilled in the art that the precise mechanism for identifying the alternate phrases can vary from system to system. One approach involves the use of translation or rewrite rules such as the set given by way of example in FIG. 7. With the code shown in FIG. 7, if a user said "Move to the top of the next section", the translation rule would be move(nextsection, top). If a user said "Jump to the beginning of the next section, the translation rule produced would also be move(nextsection, top). If a user said something with a different meaning, however, then the translation rule produced would be different. For example, "Move to the bottom of the last page" would produce move(lastpage, bottom). FIG. 7 is one example of a set of translation rules and it will be recognized by those skilled in the art that many different translation rules are possible for use with different commands and formats, all such rules being within the scope of the invention.

The translation rules provide a way to unambiguously identify phrases that have the same functional consequences—they identify the alternate ways to say something in a given grammar. All that is required to find the alternates is to search through the translation rules produced by the grammar, then present the alternates to the user as previously described.

For systems that do not support translation rules, different methods of producing the function expressed in the natural commands phrase would be required. For example, a parsing program can be used for this purpose. It will be readily appreciated by those skilled in the art that any method suitable procedure can be used to accomplish the foregoing result provided that it is capable of taking a given phrase, determining its functional expression or result and searching the set of all functional expressions permitted in the grammar to identify the alternate speech phrases that could produce that functional expression.

In step 80 the system makes a determination as to whether any alternate commands are identified. If so, these alternate commands are presented to the user in step 84. In a preferred embodiment, the alternate commands are displayed in the alternates list 96 shown in FIG. 6. If no alternate commands exist in the active command grammar, then the system notifies the user in step 82 that there are no alternate commands. This can be accomplished by any suitable means such as by displaying the message "<no alternates for this phrase>".

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer speech recognition system, a method for efficiently identifying valid system commands to users comprising the steps of:
   receiving data representative of at least a complete speech recognition system command in a single user input;
   comparing said data to a grammar defined for said speech recognition system to determine whether said data is representative of a user input which is a complete and valid system command; and
   notifying said user as to whether said data is representative of a complete and valid system command.

2. The method according to claim 1 further comprising the steps of:
   determining a functional expression for said data; and
   comparing said functional expression to a set of all functional expressions permitted in said grammar to identify any alternate user inputs for producing said functional expression.

3. The method according to claim 2 further comprising the step of notifying said user of said alternate user inputs for producing said functional expression.

4. The method according to claim 3 further comprising the step of listing said alternate user inputs in sequence based upon criteria selected from the group consisting of: the order in which they were identified in the search, alphabetical order, length, recognition accuracy, and a user preference.

5. The method according to claim 2 further comprising the step of notifying said user that there exist no alternate user inputs for producing said functional expression.

6. The method according to claim 2 wherein said determining step is performed by searching a set of translation rules to identify said functional expression and said alternate user inputs.

7. A computer speech recognition system for efficiently identifying valid system commands to users comprising:
   interface means for receiving data representative of at least a complete speech recognition system command in a single user input;
   processor means for comparing said data to a grammar defined for said speech recognition system to determine whether said data is representative of a user input which is a complete and valid system command; and
   display means for notifying said user as to whether said data is representative of a complete and valid system command.

8. The system according to claim 7 further comprising:
   function determining means for determining a functional expression for said data; and
   function comparison means for comparing said functional expression to a set of all functional expressions permitted in said grammar to identify any alternate user inputs for producing said functional expression.

9. The system according to claim 8 wherein said display means further comprises means for notifying said user of said alternate user inputs for producing said functional expression.

10. The system according to claim 9 wherein said display means further comprises means for listing said alternate user inputs in sequence based upon criteria selected from the group consisting of: the order in which they were identified in the search, alphabetical order, length, recognition accuracy, and a user preference.

11. The system according to claim 8 wherein said display means further comprises means for notifying said user that there exist no alternate user inputs for producing said functional expression.

12. The system according to claim 8 wherein said function determining means includes means for searching a set of translation rules to identify said functional expression and said alternate user inputs.

13. A machine readable storage, having stored thereon a computer program having a plurality of code sections executable by a machine for causing the machine to perform the steps of:
   receiving data representative of at least a complete speech recognition system command in a single user input;
   comparing said data to a grammar defined for said speech recognition system to determine whether said data is representative of a user input which is a complete and valid system command; and
   notifying said user as to whether said data is representative of a complete and valid system command.

14. The machine readable storage according to claim 13 for causing the machine to perform the further steps of:
   determining a functional expression for said data; and
   comparing said functional expression to a set of all functional expressions permitted in said grammar to identify any alternate user inputs for producing said functional expression.

15. The machine readable storage according to claim 14 for causing the machine to perform the further step of notifying said user of said alternate user inputs for producing said functional expression.

16. The machine readable storage according to claim 15 for causing the machine to perform the further step of listing said alternate user inputs in sequence based upon criteria selected from the group consisting of: the order in which they were identified in the search, alphabetical order, length, recognition accuracy, and a user preference.

* * * * *